(12) United States Patent
Zinbi et al.

(10) Patent No.: US 12,181,084 B2
(45) Date of Patent: *Dec. 31, 2024

(54) CLAMPING SYSTEM FOR CONNECTING TUBES, COMPRISING A COLLAR AND A SEAL

(71) Applicant: Caillau, Issy-les-Moulineaux (FR)

(72) Inventors: Abdelfettah Zinbi, Romorantin-Lanthenay (FR); Quentin Minet, Villentrois (FR); Eric Mesnard, Tours en Sologne (FR); Stéphane Drivon, Romorantin-Lanthenay (FR)

(73) Assignee: Caillau (FR)

( * ) Notice: Subject to any disclaimer, the term of this patent is extended or adjusted under 35 U.S.C. 154(b) by 40 days.

This patent is subject to a terminal disclaimer.

(21) Appl. No.: 17/916,107

(22) PCT Filed: Mar. 26, 2021

(86) PCT No.: PCT/FR2021/050544
§ 371 (c)(1),
(2) Date: Sep. 30, 2022

(87) PCT Pub. No.: WO2021/198604
PCT Pub. Date: Oct. 7, 2021

(65) Prior Publication Data
US 2023/0160507 A1     May 25, 2023

(30) Foreign Application Priority Data

Apr. 3, 2020  (FR) ...................................... 2003382

(51) Int. Cl.
*F16L 23/08*     (2006.01)
*F16L 17/04*     (2006.01)
(Continued)

(52) U.S. Cl.
CPC ................ *F16L 23/22* (2013.01); *F16L 17/04* (2013.01); *F16L 21/065* (2013.01); *F16L 21/08* (2013.01); *F16L 23/08* (2013.01); *F16L 23/18* (2013.01)

(58) Field of Classification Search
CPC .......... F16L 21/065; F16L 17/04; F16L 23/08
See application file for complete search history.

(56) References Cited

U.S. PATENT DOCUMENTS

| 4,185,858 A | 1/1980 | Peash |
| 5,782,499 A * | 7/1998 | Gfrerer .................... F16L 23/08 285/23 |

(Continued)

FOREIGN PATENT DOCUMENTS

| EP | 1 451 498 A1 | 9/2004 |
| EP | 2 598 785 A1 | 6/2013 |

(Continued)

OTHER PUBLICATIONS

International Preliminary Report on Patentability and Written Opinion of International Application No. PCT/FR2021/050544 dated Sep. 29, 2022 (and English Translation), 12 pages.

(Continued)

*Primary Examiner* — Matthew Troutman
*Assistant Examiner* — Fannie Kee
(74) *Attorney, Agent, or Firm* — Lippes Mathias LLP (57) ABSTRACT

The clamping system is used to connect a first and a second tube whose facing ends have bearing surfaces protruding relative to their cylindrical external surface. The clamping system has a clampable collar and a seal. The collar includes a belt able to cooperate with the bearing surfaces of the tubes by this internal periphery delimiting a recess into which the bearing surfaces can be inserted. The seal is supported by the collar in the unclamped state of the latter and includes an (Continued)

annular sealing portion which includes a first washer and a second washer fixed to the first washer by retaining lugs carried by the first washer.

20 Claims, 9 Drawing Sheets

(51) Int. Cl.
*F16L 21/06* (2006.01)
*F16L 21/08* (2006.01)
*F16L 23/18* (2006.01)
*F16L 23/22* (2006.01)

(56) References Cited

U.S. PATENT DOCUMENTS

| | | | | |
|---|---|---|---|---|
| 7,399,005 | B2 * | 7/2008 | Rigollet | F16L 23/08 285/410 |
| 9,016,731 | B2 * | 4/2015 | Rigollet | F16L 23/08 285/334.5 |
| 10,228,084 | B2 * | 3/2019 | Vosgeois | F16L 23/08 |
| 10,563,799 | B2 * | 2/2020 | Prevot | F16L 23/08 |
| 10,612,705 | B2 * | 4/2020 | Prevot | F16L 23/08 |
| 10,634,270 | B2 * | 4/2020 | Rigollet | F16L 23/08 |
| 2019/0093803 | A1 * | 3/2019 | Wu | F16L 23/08 |
| 2019/0331270 | A1 * | 10/2019 | Drivon | F16L 23/08 |
| 2020/0141525 | A1 * | 5/2020 | Drivon | F16L 23/08 |
| 2021/0148498 | A1 * | 5/2021 | Jacquelin | F16L 23/08 |
| 2021/0310592 | A1 * | 10/2021 | Mesnard | F16L 23/08 |

FOREIGN PATENT DOCUMENTS

| | | |
|---|---|---|
| EP | 3 232 107 A1 | 10/2017 |
| WO | WO 03/002306 A2 | 1/2003 |

OTHER PUBLICATIONS

International Search Report of International Application Serial No. PCT/FR2021/050544 dated Aug. 9, 2021, (w/English Translation) 6 pages.

* cited by examiner

CLAMPING SYSTEM FOR CONNECTING TUBES, COMPRISING A COLLAR AND A SEAL

BACKGROUND OF THE DISCLOSURE

The disclosure relates to a clamping system for connecting a first and a second tube whose facing ends have bearing surfaces protruding relative to the cylindrical external surface of said tubes, the system comprising a collar and a seal, the collar being able to be clamped around the bearing surfaces of the tubes.

STATE OF THE ART

Patents EP 1 451 498, EP 2 598 785 and EP 3 232 107 disclose clamping systems comprising a collar which has a belt able to be clamped by the reduction of its diameter and a seal pre-mounted in the collar. More specifically, this system comprises a washer which comprises a closed annular portion forming the seal and lugs connecting this seal to the collar. The closed annular seal is initially held relative to the belt of the collar such that a space is arranged between the seal and the inner periphery of the belt, so as to allow the engagement of the end of a tube between the seal and the belt. Then, the inner tube is itself engaged so as to come into contact with the seal. This device is particularly suitable for the clamping of two tubes fitted together and having radially protruding surfaces serving as a bearing for a clamping collar which comprises a recess that can house these radially protruding surfaces, the closed annular seal itself having a shape adapted to these protruding surfaces.

Particularly, such a seal can be made of a metal of the stainless steel type, as well as the belt of the collar.

SUMMARY OF THE DISCLOSURE

For some applications, particularly in the automotive field, in particular for the exhaust lines of combustion engines, there is a need to improve the seals of the aforementioned type, so that they can withstand increasingly higher temperatures. Indeed, as technology evolves, it may happen that the temperature of the tubes and, particularly, the temperature of their portions in contact with the seal, reaches several hundred degrees, for example 900° C. even more. However, at such temperatures combined with high clamping stresses, the metal material of the seal can lose part of its elasticity, necessary to maintain the sealing. Thicker metal seals could ensure a sealing at high temperatures and high clamping stresses, but such seals are expensive, heavy, and inefficient when cold. Thus, if the clamping system is used to connect two tubes forming part of the exhaust line of the heat engine of a vehicle, such a thick seal would hardly be effective at start-up of the engine.

The disclosure aims to overcome at least substantially the aforementioned drawbacks.

Thus, the disclosure relates to a clamping system for connecting a first and a second tube whose facing ends have bearing surfaces protruding relative to the cylindrical external surface of said tubes, the system comprising a clampable collar and a seal, the collar including a belt able to cooperate with said bearing surfaces by its internal periphery delimiting a recess into which the bearing surfaces can be inserted, the seal being supported by the collar in the unclamped state of the latter and comprising an annular sealing portion which comprises a first washer and a second washer fixed to the first washer, the first washer carrying retaining lugs which cooperate with the second washer to retain said second washer relative to the first washer.

Optionally, the first washer is metallic.

Optionally, the retaining lugs are cut out in the first washer.

Optionally, the first washer carries support lugs by which said first washer and said second washer are supported relative to the collar.

Optionally, at least some of the support lugs are formed in one piece with the first washer.

Optionally, at least some of the retaining lugs are formed in the support lugs.

Optionally, at least some of the retaining lugs are formed by portions of the support lugs protruding radially inwardly, particularly by wings folded over longitudinal edges of the support lugs or tabs cut out in the support lugs and bent inwardly.

Optionally, the first washer has a stamped frustoconical surface and the second washer is formed in a planar ring, deformed to match the frustoconical shape of the frustoconical surface.

Optionally, the second washer is formed from a composite material.

Optionally, the second washer is formed from a mica-based material.

Optionally, the second washer comprises mineral particles, particularly mica or graphite, and a binder.

Optionally, the second washer comprises a reinforcement, particularly a metal reinforcement.

Optionally, the first washer has an annular bulge on a first face of said first washer and the second washer is disposed against said first face.

Optionally, the second washer has an annular bulge on a first face of said second washer and said first faces of the first washer and of the second washer are disposed against each other, so that the annular bulges are in contact.

Optionally, the second washer also has an annular bulge on its second face and said annular bulges of the second washer optionally delimit together an annular space.

Optionally, the annular sealing portion further comprises an additional second washer fixed to the first washer, so that the first washer is located between the second washer and the additional second washer.

According to the disclosure, the seal of the clamping system therefore comprises two washers which are fixed together by retaining lugs carried by the first washer. Thus, the two washers are fixed together by mechanical means, which do not deteriorate over time and are simple to implement. The retaining lugs may not require any material outside of the first washer and be directly manufactured with it. Particularly, it may not be necessary to fix the two washers together using glue. The retaining lugs are used to fix the two washers together, while possibly allowing slight movements between the two washers, thus facilitating their adjustment during the clamping, to optimize the sealing.

Particularly, it is possible to avoid the presence, between the two washers, of a thickness of material which could be linked to a fixing by welding or bonding and which could harm the sealing.

The set of these two washers can be carried relative to the collar using a suitable configuration of the seal. The portion necessary to the sealing, namely the first washer and the second washer, can be easily shaped to meet the need for the sealing, while taking into account the clamping stresses and the concerned temperature levels. Particularly, the second washer can be metallic or comprise a material adapted to retain elastic deformability at high temperature and to contribute to a sealing over wide temperature and stress ranges, particularly a mica-based material. The seal can be light, the first washer portion conferring its strength and its mechanical resistance, the non-metal based portion contributing to its effectiveness, in particular for high temperature and pressure ranges.

DETAILED DESCRIPTION OF THE PREFERRED EMBODIMENTS

Figure 1:
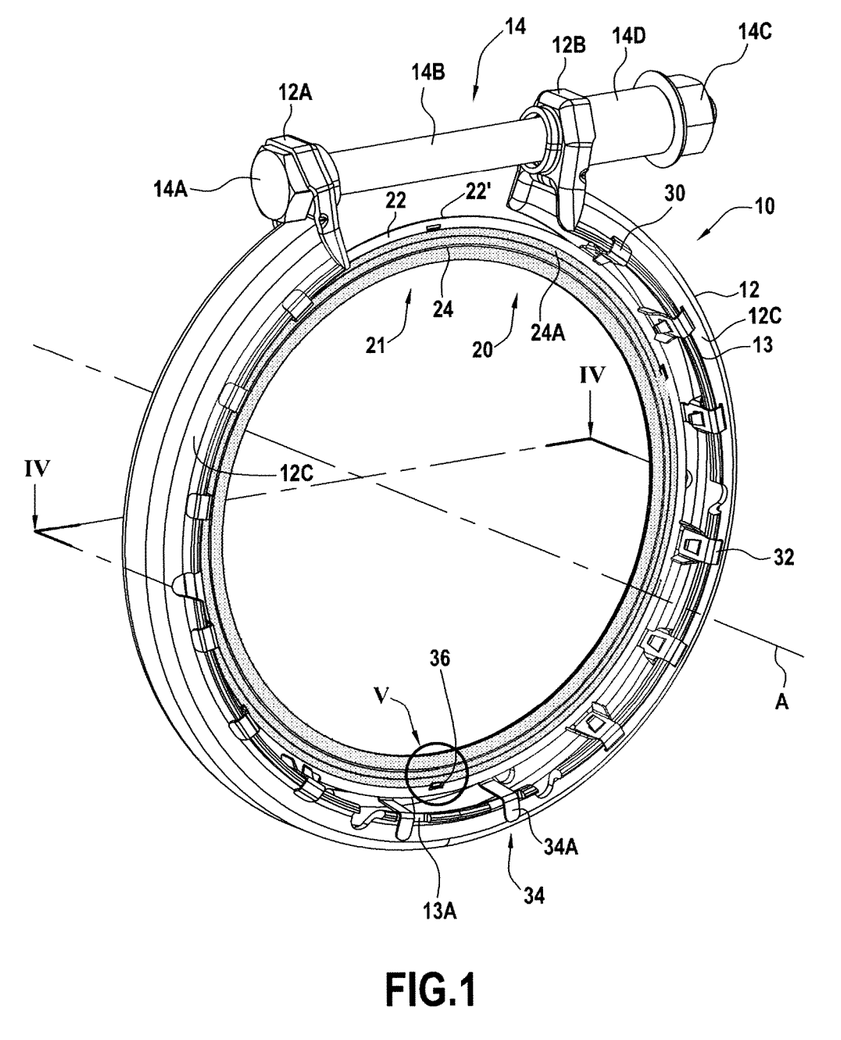
FIG. 1 is a perspective view of a clamping system according to the present disclosure taken from a first side.

FIG. 1 shows a clamping collar 10 comprising a belt 12 whose ends are raised radially so as to form clamping lugs respectively 12A and 12B. To clamp the collar, the diameter of the belt is reduced by cooperation of a clamping screw 14 with the clamping lugs 12A and 12B. The shank 14B of the screw passes through bores in the clamping lugs, its head 14A cooperating with the lug 12A and the opposite end being provided with a nut 14C cooperating with the lug 12B in this case via a spacer 14D.

Figure 4:
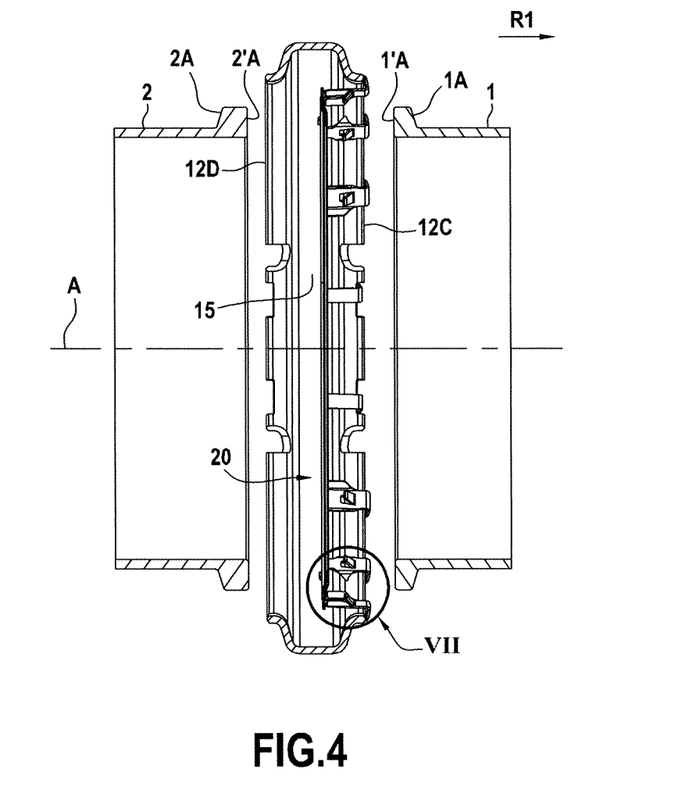
FIG. 4 is an axial sectional view in the plane IV of FIG. 1 showing, on the one hand, the clamping system according to the disclosure and, on the other hand, the ends of two tubes to be assembled using this clamping system.

The belt 12 has an inner recess 15 (better visible in FIG. 4) arranged between two flanks, respectively 12C and 12D, of this belt. A seal 20 is disposed inside the belt. As best seen in FIG. 4, the clamping system is used to connect two tubes 1 and 2 whose ends are provided with bearing surfaces 1A and 2A. To connect the tubes, their ends are brought together until they are axially in the recess 15, and the diameter of the belt is reduced so that the flanks 12C and 12D press against the bearing surfaces 1A and 2A. In this case, the bearing surfaces 1A and 2A are formed on radial flanges that the ends of the tubes 1 and 2 have. As indicated, the seal 20 is disposed inside the collar. For the connection of the tubes 1 and 2, the front surfaces 1'A and 2'A of the ends of the tubes 1A and 2A are placed on either side of an annular sealing portion 21 that the seal 20 has.

Within the meaning of the present disclosure, the forward direction, for the tube 1 or 2, is the direction towards the other tube 2 or 1 when their ends are brought together to assemble the tubes. Thus, the bearing surfaces 1A and 2A are formed on the rear faces of the radial flanges that the ends of the tubes have. The backward direction is obviously the opposite direction. For an element, the inward direction is the direction towards the axis A of the belt. The outward direction is opposite.

This annular sealing portion comprises a first washer 22 and a second washer 24 fixed to the first washer. In this case, as understood by considering FIGS. 1, 2 and 3 together, the annular sealing portion comprises the first washer 22, the second washer 24 disposed on a first face of the first washer and an additional second washer 26 disposed on the other face of the first washer. Thus, the first washer 22 is sandwiched between the second washers 24 and 26.

For example, the first washer 22 can be manufactured from the same metal as the belt 12, for example stainless steel. The second washer(s) 24, 26 can be formed from metal, or be non-metal based, by being particularly formed from a composite material. They can be formed from a mica-based material. They can be formed from the same material or from different materials, for example one in metal, the other in composite material, for example mica-based material. When they are non-metal based, the second washer(s) can comprise mineral particles, particularly mica or graphite, and a binder. The two washers may or may not have the same thickness, whether or not they are made of the same material. The second washer(s) can comprise a reinforcement, particularly a metal reinforcement, supporting non-metal material, particularly a mica or graphite based composite material. For example, the reinforcement can be a fine wire mesh.

The indication that the washer 24 or 26 is "non-metal based" means that this washer does not include metal or that, if it includes metal, for example a metal reinforcement, the metal represents in mass only a minor portion of this washer, for example the mass of metal does not represent more than 40% of that of the washer, particularly not more than 20 or 30%.

Figure 2:
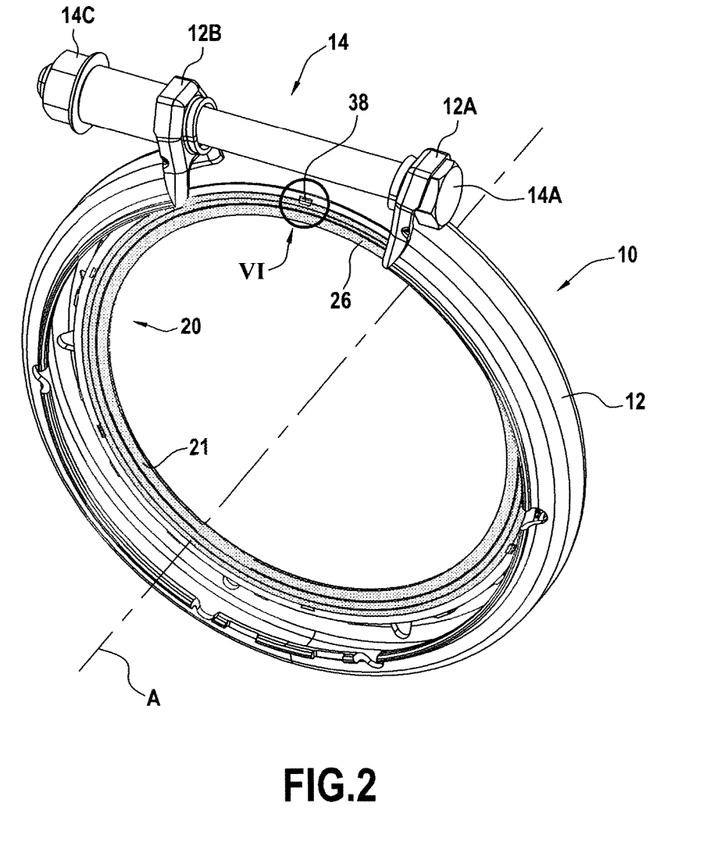
FIG. 2 is a perspective view of the system represented in FIG. 1, taken from the other side.
Figure 3:
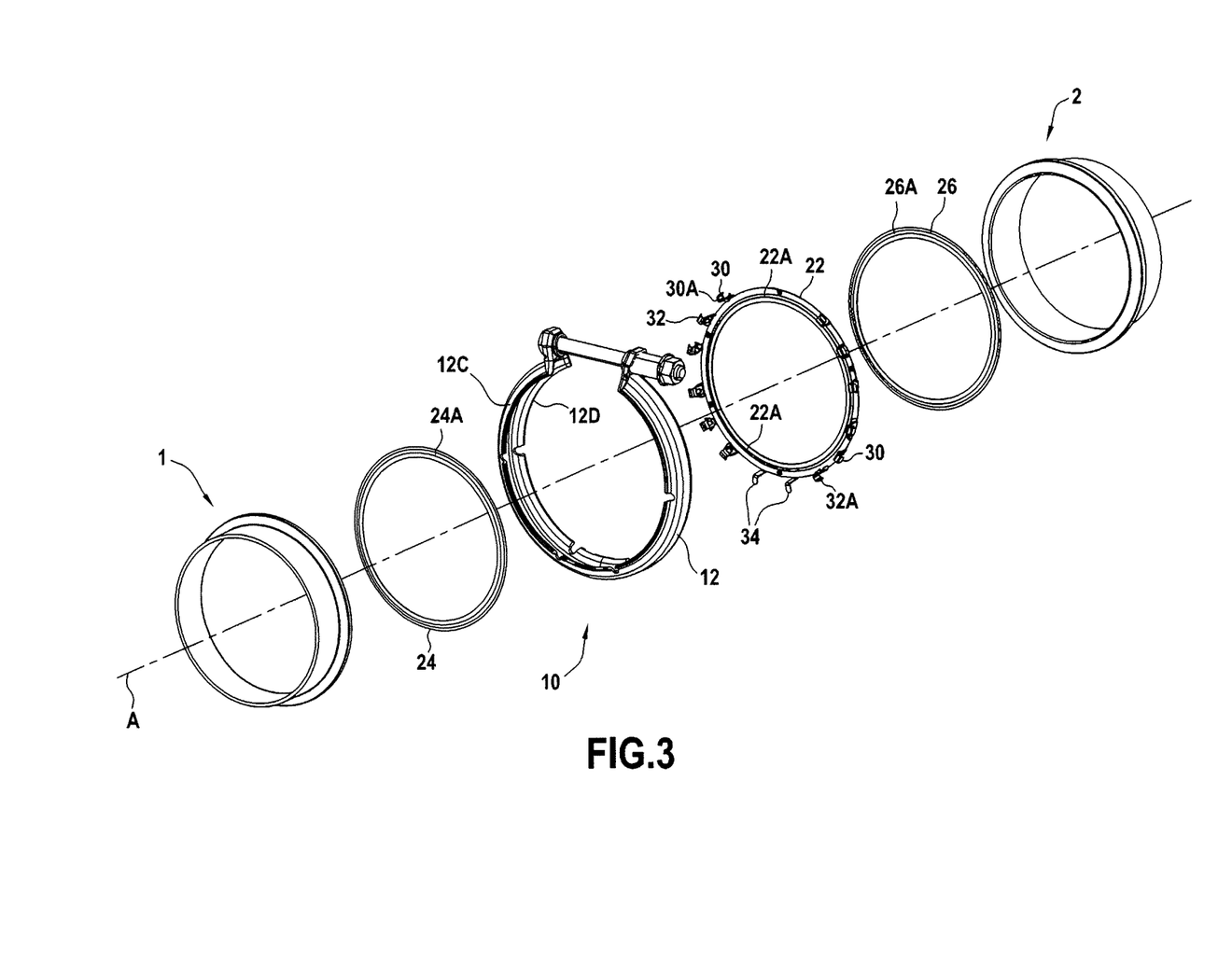
FIG. 3 is an exploded perspective view showing different elements constituting the clamping system represented separately, as well as the ends of two tubes to be assembled using this system.

The second washer(s) 24 and 26 are carried by the first washer 22. Thus, as can be seen in FIGS. 1 to 3, this first washer 22 carries support lugs by which the first washer and the second washer are supported relative to the collar 10. The seal is thus premounted in the belt, that is to say, before the collar is placed on the tubes and clamped, the seal is carried by the collar so that the collar and the seal can be handled as a whole.

Furthermore, the first washer can also carry support lugs used for the pre-mounting of the collar equipped with the washer on one of the tubes to be assembled. Thus, the assembly formed by the collar and the seal can be disposed at the end of one of the tubes and remain in place at this end, before placing the end of the other tube and clamping the collar. The same lugs can have the dual function of being used for the pre-mounting of the seal in the belt and to pre-mount the assembly formed by the collar and the seal at the end of one of the tubes. These support lugs are carried by the outer periphery (away from the axis A of the belt), of the first washer 22.

In this case, three different types of lugs have been represented. As can be seen better in FIGS. 7 and 9, the support lugs 30 have hooked curved ends 30A so as to be able to hook onto the edge 13 of the flank 12C of the belt 12. Between their area of connection to the outer periphery 22' of the first washer 22 and this hook 30A, these support lugs 30 have an axial segment 30B which extends substantially axially, that is to say substantially parallel to the axis A. As can be seen better in FIG. 7, this axial segment 30B has, on the one hand, a hooking tab 30C which is cut out in the axial segment 30B and folded radially inwardly by extending towards its free end, in the direction from the hook 30A to the outer periphery 22' of the first washer 22. This tab 30C is used to grip the washer on the bearing surface 1A of the tube 1 to retain the collar premounted at the end of this tube. It is seen that the orientation of these tabs 30C prevents the tube from being disengaged from the washer in the rearward direction for this tube 1, according to the arrow R1 indicated in FIG. 4.

Figure 7:
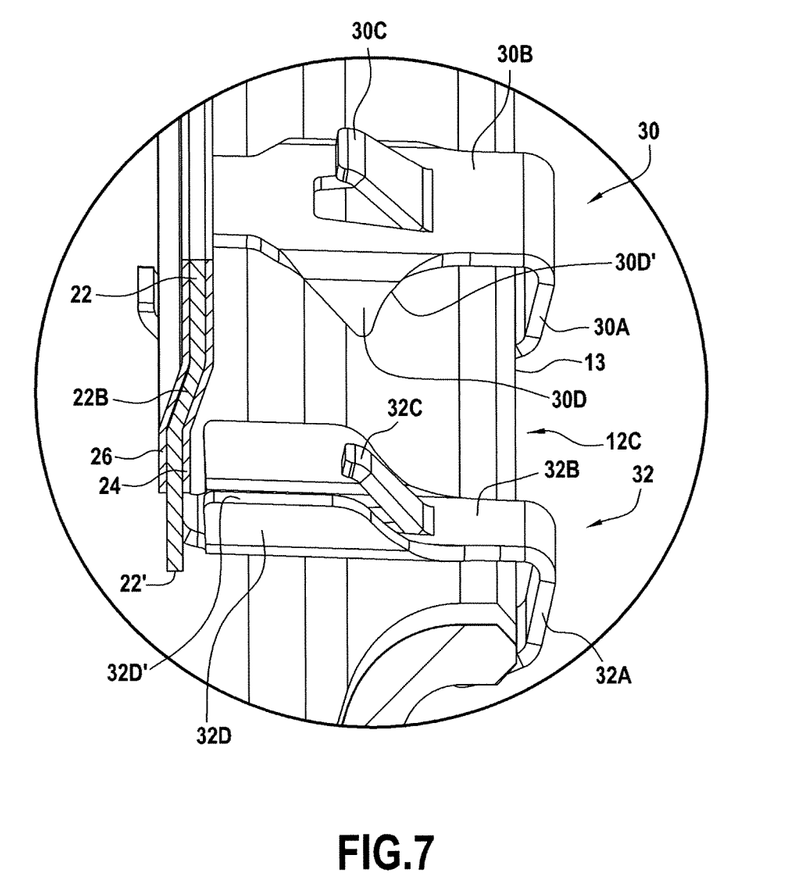
FIG. 7 is a view of detail VII of FIG. 4.

Furthermore, the support lugs 30 have wings 30D which, from the longitudinal edges of the axial segments 30B, are folded radially outwardly, that is to say so as to move away from the axis A. Furthermore, these wings 30D have a retaining edge 30D' directed towards the inner face of the hook 30A and therefore towards the inner face of the flank 12C of the belt 12 when the seal is premounted in the washer. These retaining edges 30D' are spaced from the inner faces of the hooks 30A. The edge 13 of the flank 12C is housed in the space thus arranged between the hook 30A and the retaining edge 30D. This allows maintaining the first washer 22 relative to the belt of the collar by retaining it in both axial directions.

The support lugs also comprise support lugs 32 which also have hooks 32A at their free ends opposite to their areas of attachment to the outer periphery 22' of the washer 22. These support lugs 32 also comprise axial segments 32B which extend substantially axially between the attachment of these lugs to the washer 22 and the hooks 32A. These support lugs 32 also have hooking tabs 32C similar to the tabs 300 described previously. Finally, these support lugs 32 also comprise wings 32D which are however oriented in the opposite direction to the aforementioned wings 30D. Indeed, the wings 32D are folded radially inwardly from the longitudinal edges of the axial segments 32B. These wings 32D have longitudinal edges 32D' which contribute to the pre-mounted retention of the collar on the end of the tube 1 by retaining the washer relative to the tube with respect to radial displacements.

The first washer also has support lugs 34 which, as can be seen in FIGS. 1 and 3, have hooks 34A at their free ends opposite to the outer periphery 22' of the washer 22 and axial segments which extend from this washer to these hooks. These support lugs 34 are used for the angular wedging of the washer relative to the belt, the hooks 34A being engaged in notches 13A that the edge 13 of the flank 12C of the belt has.

Generally, the support lugs 30 and the support lugs 32 are disposed alternately on the outer periphery of the washer 22. These lugs 30 and 32 are used for the hooking on the edge 13 of the flank 12C of the belt 12 by preventing the seal from moving relative to the belt in the opposite direction to the direction R1 indicated in FIG. 4. The wings 30D are used to retain the washer relative to the belt by limiting its movement in the direction R1 relative to the belt. These lugs, as well as the lugs 32 also have the tabs 30C or 32C used to retain the end of the tube inside the washer. The lugs 32 also have the wings 32D used to center the tube relative to the washer.

As seen in particular in FIG. 3, the support lugs 30 and 32 are formed in one piece with the first washer. In fact, this first washer is formed in one piece from a strap, by cutting, stamping and bending.

In the example represented in FIGS. 1 to 4, the first washer 22 and the second washers 24 and 26 are substantially planar. Indeed, the front faces 1'A and 2'A of the flanges on which the bearing surfaces of the tubes 1 and 2 on which they are radially oriented are formed.

Figure 8:
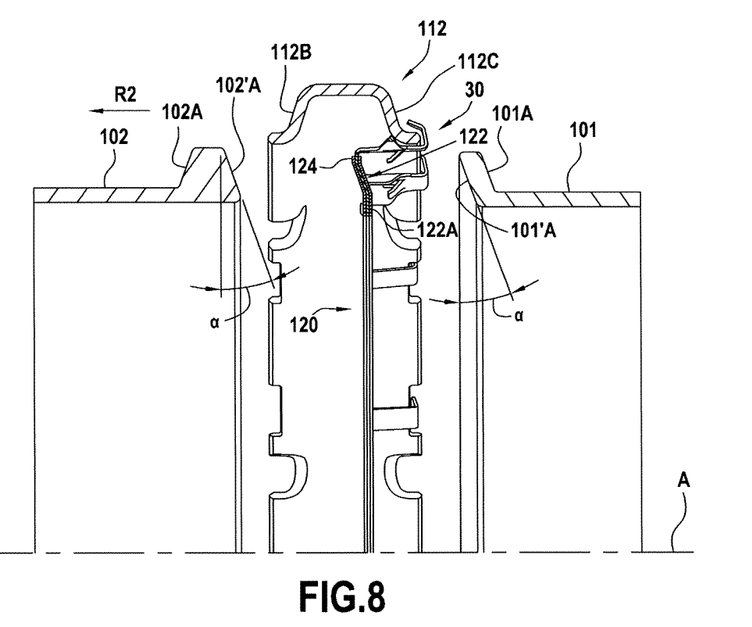
FIG. 8 is a view in partial axial cross-section taken like that of FIG. 4, for an alternative embodiment.

However, as indicated for example in the patents EP 1 451 498, EP 2 598 785 or EP 3 232 107, the collar can be pre-mounted on tubes whose bearing surfaces are frusto-conical. In this case, as seen in FIG. 8, the first washer 122 can have a frustoconical surface, particularly a stamped frustoconical surface. The cross-section of FIG. 8 shows the seal 120 with the washer 122 and support lugs 30, 32 and 34, similar to the lugs previously described. This belt 112 is similar to the belt 12, except that its flanks 112C and 112B can be inclined like the branches of a V, adapted to the flare of the tubes 101 and 102. Indeed, the bearing surface 101A of the tube 101 has a frustoconical shape forming a flare, and the bearing surface 102A of the tube 102 has a front face 102'A, which also forms a frustoconical surface so as to be adapted to the aforementioned flare. The bearing surface 102A formed at the rear in the direction R2 relative to the frustoconical section 102'A, is also frustoconical in the opposite direction, substantially parallel to the flank 112B of the belt 112. As indicated, the first washer has a stamped frustoconical surface 122A, adapted to the shapes of the surfaces 101'A and 102'A of the tubes whose connection must be sealed using the seal 120. The second washer 124 is for its part formed in a planar ring which is deformed to match the frustoconical shape of the frustoconical surface of the first washer 122.

When it is made of non-metal based material, this washer 124 cannot always be stamped. It can be advantageous to form it from a planar plate for reasons of manufacturing cost. However, to some extent, an initially planar (flat manufactured) non-metal based washer can be deformed to match the frustoconical shape of the surface 122A of the washer 122.

The angle α formed by the aforementioned frustoconical surfaces of the tubes relative to the direction perpendicular to the axis A is for example on the order of 20 degrees maximum for an initially planar non-metal based washer. A higher angle α, for example on the order of 45° can for example be obtained, by using a second washer which is not initially planar, but shaped accordingly, for example by heating, particularly when it is a washer comprising a thermoformable binder.

Figure 5:
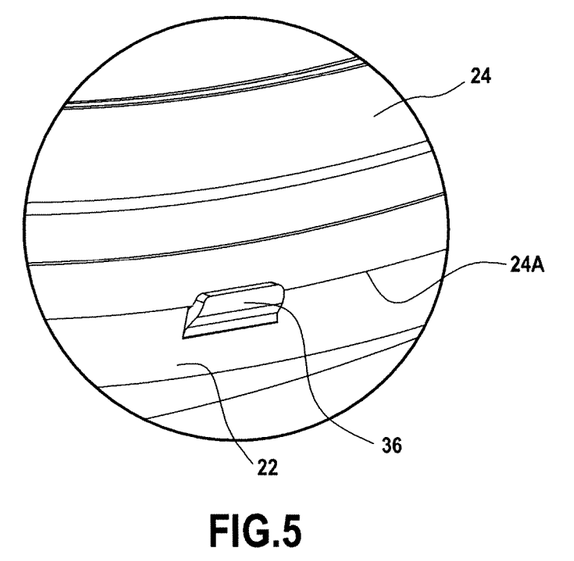
FIG. 5 is an enlarged view of detail V in FIG. 1.
Figure 6:
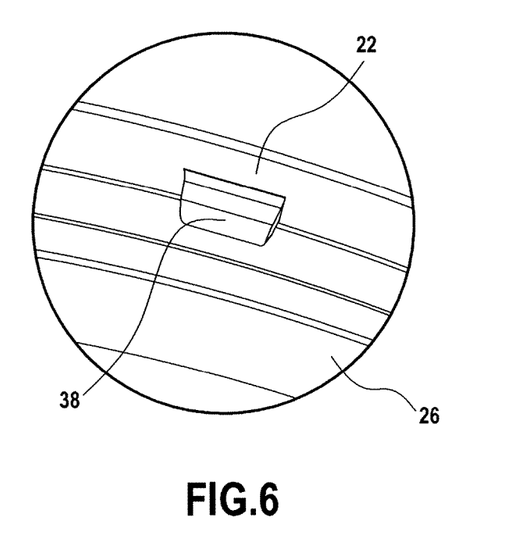
FIG. 6 is an enlarged view of detail VI of FIG. 2.

XXXThe second washer 24 can, unlike the first washer 22, be purely annular, by being devoid of fixing, support lugs or the like. The second washer is carried by the first washer 22. The second washer 24 is fixed to the first washer 22 by retaining lugs carried by the latter. Thus, the second washer 24 can be supported by the first washer 22 by purely mechanical means not using an external material such as glue. Thus, in FIGS. 1 and 5, it is seen that the first washer 22 has retaining lugs 36 which are formed by cutouts of this washer slightly straightened axially to form tabs whose free ends are oriented towards the axis A. These retaining lugs 36 are thus used to wedge and retain the second washer 24 by cooperating with its outer radial edge 24A. Similarly, as seen in FIGS. 2 and 6, the first washer 22 has retaining lugs 38 which are similar to the retaining lugs 36 but are oriented axially on the other side to retain the additional second washer 26 located on the other face of the washer 22.

In this example, the retaining lugs 36 or 38 retain the washers 24 or 26 by their outer radial edges. It could of course be possible to provide similar lugs but used to retain these washers by their inner radial edges or a combination of lugs cooperating with the inner radial edges and the outer radial edges of the washers 24 and 26.

Figure 10:
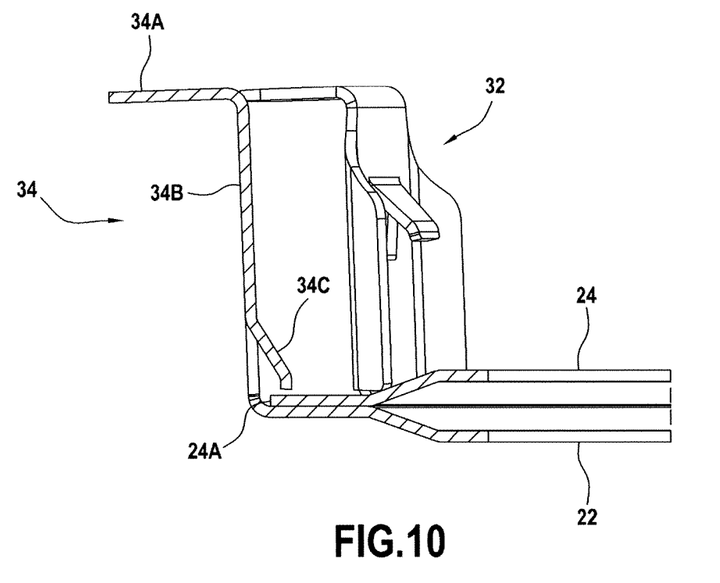
FIG. 10 is a partial view in axial cross-section, showing one variant.
Figure 11:
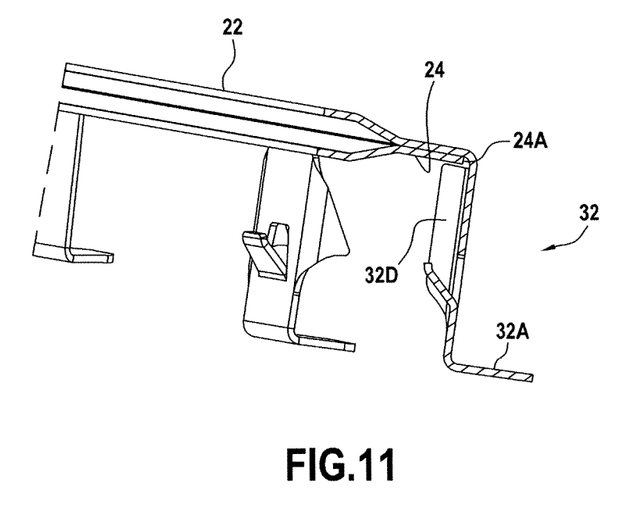
FIG. 11 is a partial perspective view, showing one variant.
Figure 12:
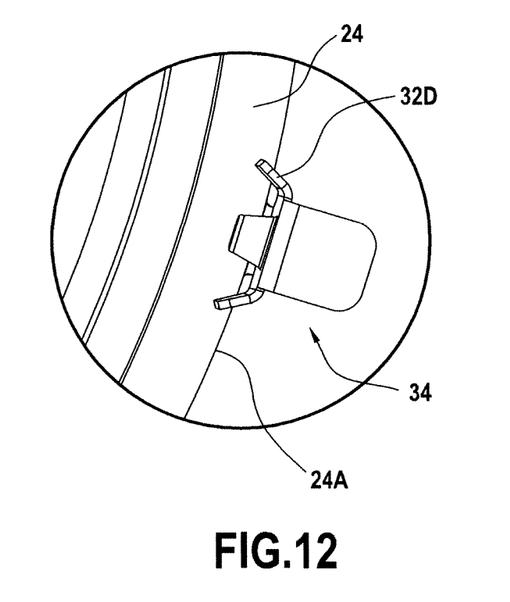
FIG. 12 is a partial view seen along the axis of the belt, showing the variant of FIG. 11.

As seen in FIGS. 10 to 12, the support lugs of the first washer can comprise retaining lugs to retain the second washer relative to the first washer. Thus, FIG. 10 shows the first washer 22 with one of its support lugs 32 and one of its support lugs 34. FIG. 10 also shows the second washer 24 whose outer diameter is almost equal to the outer diameter of the first washer 22, being very slightly smaller. Thus, the outer edge 24A of the second washer 24 extends substantially up to the circle delimiting the outer edge of the first washer 22, between the support lugs. It can be seen in FIG. 10 that the support lug 34, or more specifically its axial segment 34B, has a hooking tab 34C which forms a retaining lug for the second washer 24. This retaining lug 34C is cut out in the axial segment 34B by being attached thereto through its end close to the hook 34A, while its opposite end is free. The retaining lug 34C can be cut out in a circumferentially central region of the axial segment 34B or on the contrary on a longitudinal edge of the latter. The retaining lug 34C is bent radially inwardly. The free end of the retaining lug 34C is located radially more inwardly than the outer edge 24A of the second washer 24 which allows it to perform its retaining lug function. When assembling the two washers, the edge 24A of the second washer 24 and/or the retaining lug 34C can be deflected elastically to allow the insertion of the outer edge of the second washer 24 under the free end of the hooking tab 34C.

The wings 32D of the support lugs 32 can also act as retaining lugs for the second washer 24.

This is best seen in FIGS. 11 and 12, which show that the outer edge 24A of the second washer 24 arrives radially under the wings 32D, in the space arranged between the edges of these wings away from the hook 32A and the outer edge of the annular portion of the first washer 22. The outer edge 24A of the second washer can be deflected elastically to allow the insertion of this outer edge into this space, when assembling the two washers.

The first washer 22 can have an annular bulge or, in general, an annular relief giving it a capacity for axial deformation. For example, in FIG. 3, it can be seen that the washer 22 has an annular bead 22A protruding on one of its faces, against which the second washer 24 is disposed. The second washer 24 or the additional second washer 26 can for its part be perfectly planar. It can also have an annular bulge 24A, particularly whose convexity can be reversed relative to those of the annular bulge 22A of the washer 22 and whose diametrical dimensions correspond to those of the bulge 22A. In this case, when the washer 24 is assembled to the washer 22, their respective bulges can therefore be in contact by their convex faces, which is a way of allowing axial deformations of the washers under the clamping forces in the areas of the bulges to ensure a good sealing. The washer 26 can for its part have an annular bulge 26A which can have a convexity of a direction similar to that of the annular bulge 22A so as to be "embedded" partly in this bulge, in which case it is rather the areas of the washers other than the bulges that can be deformed under the clamping forces. These bulges can also be in the opposite direction. Thus, if the washers 22 and 24 that have just been described are considered, it can be seen that they each have an annular bulge on their respective first faces disposed against each other, so that these annular bulges are in contact. A reverse situation could be provided, with the annular bulge 22A of the washer 22 oriented oppositely, that is to say in the direction forming a hollow on the side of the second washer 24, and with the second washer 24 having an annular bulge protruding on the opposite side to the washer 22 so that its concavity is turned towards the washer 22. Thus, the two annular bulges are disposed on opposite faces of the washers and, when they are associated, the respective annular bulges delimit together a recessed annular space. This is another way to promote the axial deformability of the washers to promote the sealing.

Figure 9:
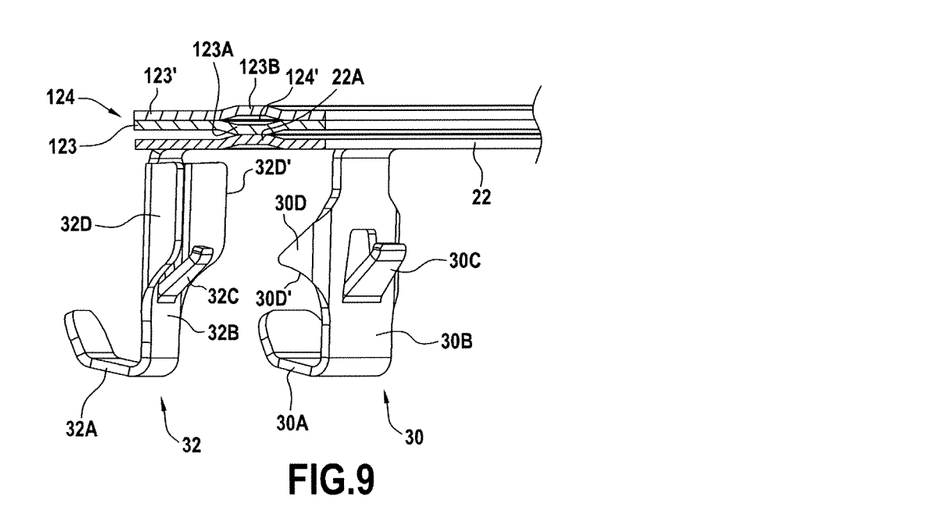
FIG. 9 is a partial perspective view showing one variant for the seal.

FIG. 9 shows one example in which the second washer 124 is in fact formed of two elementary washers, respectively 123 and 123' fixed together, for example by bonding or by a mechanical fixing implementing retaining lugs, by example similar to the retaining lugs 36 or 38 mentioned above. Each of these elementary washers 123 and 123' has an annular bulge, respectively 123A and 123B. Thus, the washer 124 has an annular bulge not only on its first face turned towards the first washer 22, but also on the opposite second face. The annular bulges 123A and 123B are disposed on the same diametrical dimensions so as to arrange therebetween an annular space 124'. It can also be seen in FIG. 9 that the first washer 22 has an annular bulge 22A protruding on its first face against which the washer 124 is disposed, so that the annular bulges 22A and 123A are disposed against each other.

Instead of a purely convex annular bulge, the first washer 22 can have a wave or deformation forming a slight bend so that the inner and outer radial edges of the first washer are slightly spaced axially. This is what can be seen for example in FIG. 7, in which the first washer 22 has such a slight bend 22B. The second washers 24 and 26 disposed on either side of the first washer 22 can be initially planar and be deformed to adapt to this bend during the clamping of the collar, or initially have such bends.

The reliefs, bends or bulges of the second washer (or elementary washers) can be made by any appropriate means, for example by hot shaping, particularly when the material from which this washer is made includes a thermoformable binder.

The thickness of the first washer 22, measured axially between the two faces of the latter in a area in which no bulge is present, is for example on the order of 0.2 mm to 0.8 mm, particularly on the order of 0.2 mm to 0.4 mm. The thickness of the second washer, measured in the same way, can be of 50% to 200%, particularly 120% to 200%, of the thickness of the first washer.

The invention claimed is:

1. A clamping system for connecting a first and a second tube whose facing ends have bearing surfaces protruding relative to the cylindrical external surface of said tubes, the system comprising a clampable collar and a seal, the collar including a belt able to cooperate with said bearing surfaces by its an internal periphery delimiting a recess into which the bearing surfaces can be inserted, the seal being supported by the collar in the unclamped state of the latter and comprising an annular sealing portion, said annular portion comprising a first washer and a second washer fixed to the first washer, the first washer carrying retaining lugs which cooperate with the second washer to retain said second washer relative to the first washer.

2. The clamping system according to claim 1, wherein the first washer is metallic.

3. The clamping system according to claim 1, wherein the retaining lugs are cut out in the first washer.

4. The clamping system according to claim 1, wherein the second washer is formed from a composite material.

5. The clamping system according to claim 1, wherein the second washer is formed from a mica-based material.

6. The clamping system according claim 1, wherein the second washer comprises mineral particles and a binder.

7. The clamping system according to claim 6, wherein the mineral particles comprise one or more of mica and graphite.

8. The clamping system according to claim 1, wherein the second washer comprises a reinforcement.

9. The clamping system according to claim 1, wherein the second washer comprises a metal reinforcement.

10. A clamping system for connecting a first and a second tube whose facing ends have bearing surfaces protruding relative to the cylindrical external surface of said tubes, the system comprising a clampable collar and a seal, the collar including a belt able to cooperate with said bearing surfaces by an internal periphery delimiting a recess into which the bearing surfaces can be inserted, the seal being supported by the collar in the unclamped state of the latter and comprising an annular sealing portion, said annular portion comprising a first washer and a second washer fixed to the first washer, the first washer carrying retaining lugs which cooperate with the second washer to retain said second washer relative to the first washer wherein the first washer carries support lugs by which said first washer and said second washer are supported relative to the collar.

11. The clamping system according to claim 10, wherein at least some of the support lugs are formed in one piece with the first washer.

12. The clamping system according to claim 10, wherein at least some of the retaining lugs are formed in the support lugs.

13. The clamping system according to claim 12, wherein at least some of the retaining lugs are formed by portions of the support lugs protruding radially inwardly.

14. The clamping system according to claim 12, wherein at least some of the retaining lugs are formed by at least some of wings folded over longitudinal edges of the support lugs or tabs cut out in the support lugs and bent inwardly.

15. A clamping system for connecting a first and second tube whose facing ends have bearing surfaces protruding relative to the cylindrical external surface of said tubes, the system comprising a clampable collar and a seal, the collar including a belt able to cooperate with said bearing surfaces by an internal periphery delimiting a recess into which the bearing surfaces can be inserted, the seal being supported by the collar in the unclamped state of the latter and comprising an annular sealing portion, said annular portion comprising a first washer and second washer fixed to the first washer, the first washer carrying retaining lugs which cooperate with the second washer to retain said second washer relative to the first washer, wherein the first washer has a stamped frustoconical surface and the second washer is formed in a planar ring, deformed to match the frustoconical shape of the frustoconical surface.

16. A clamping system for connecting a first and second tube whose facing ends have bearing surfaces protruding relative to the cylindrical external surface of said tubes, the system comprising a clampable collar and a seal, the collar including a belt able to cooperate with said bearing surfaces by an internal periphery delimiting a recess into which the bearing surfaces can be inserted, the seal being supported by the collar in the unclamped state of the latter and comprising an annular sealing portion, said annular portion comprising a first washer and a second washer fixed to the first washer, the first washer carrying retaining lugs which cooperate with the second washer to retain said second washer relative to the first washer, wherein the first washer has an annular bulge on a first face of said first washer and the second washer is disposed against said first face.

17. The clamping system according to claim 16, wherein the second washer has an annular bulge on a first face of said second washer and said first faces of the first washer and of the second washer are disposed against each other, so that the annular bulges are in contact.

18. The clamping system according to claim 17, wherein the second washer also has an annular bulge on its a second face.

19. The clamping system according to claim 18, wherein said annular bulges of the second washer delimit together an annular space.

20. A clamping system for connecting a first and a second tube whose facing ends have bearing surfaces protruding relative to the cylindrical external surface of said tubes, the system comprising a clampable collar and a seal the collar including a belt able to cooperate with said bearing surfaces by an internal periphery delimiting a recess into which the bearing surfaces can be inserted, the seal being supported by the collar in the unclamped state of the latter and comprising an annular sealing portion, said annular portion comprising a first washer and a second washer fixed to the first washer, the first washer carrying retaining lugs which cooperate with the second washer to retain said second washer relative to the first washer, wherein the annular sealing portion further comprises an additional second washer fixed to the first washer, the first washer being located between the second washer and the additional second washer.

* * * * *